(12) United States Patent
Bishop et al.

(10) Patent No.: US 12,435,256 B1
(45) Date of Patent: Oct. 7, 2025

(54) COMBINATION CLAY STABILIZER HAVING AN ALKALI METAL ASPHALT SULFONATE AND QUATERNARY AMMONIUM SALT

(71) Applicant: Chevron Phillips Chemical Company LP, The Woodlands, TX (US)

(72) Inventors: Marshall D. Bishop, Conroe, TX (US); Elan Watson, Montgomery, TX (US); Katrina I. Schultz, Spring, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/812,507

(22) Filed: Aug. 22, 2024

(51) Int. Cl.
*C09K 8/06* (2006.01)
*C09K 8/14* (2006.01)
*C09K 8/22* (2006.01)

(52) U.S. Cl.
CPC ............... *C09K 8/06* (2013.01); *C09K 8/145* (2013.01); *C09K 8/22* (2013.01); *C09K 2208/12* (2013.01)

(58) Field of Classification Search
None
See application file for complete search history.

(56) References Cited

U.S. PATENT DOCUMENTS

| | | | | |
|---|---|---|---|---|
| 3,028,333 A | * | 4/1962 | Stratton | C09K 8/035 507/113 |
| 4,741,868 A | * | 5/1988 | Rooney | C07C 309/62 208/44 |
| 5,502,030 A | * | 3/1996 | Patel | C09K 8/24 507/120 |
| 2006/0166833 A1 | * | 7/2006 | Huber | C09K 8/506 507/126 |
| 2012/0028855 A1 | | 2/2012 | Miller | |
| 2014/0336085 A1 | * | 11/2014 | Bishop | C09K 8/035 428/402 |
| 2017/0210966 A1 | | 7/2017 | Jung | |
| 2019/0055459 A1 | * | 2/2019 | Zelenev | C09K 8/035 |
| 2019/0136111 A1 | | 5/2019 | Hutchings | |
| 2023/0303905 A1 | * | 9/2023 | Keller | C09K 8/16 |

FOREIGN PATENT DOCUMENTS

| | | |
|---|---|---|
| CN | 105331338 A | 2/2016 |
| CN | 109266316 A | 1/2019 |
| EP | 730018 A | 9/1996 |
| GB | 2433951 B | 12/2010 |
| WO | 2009120839 A2 | 10/2009 |
| WO | 2014167375 A1 | 10/2014 |
| WO | 2016123397 A1 | 8/2015 |
| WO | 2019177594 A1 | 9/2019 |
| WO | 2019217908 A1 | 11/2019 |
| WO | 2020023398 A1 | 1/2020 |
| WO | 2020023401 A1 | 1/2020 |

\* cited by examiner

*Primary Examiner* — John J Figueroa

(74) *Attorney, Agent, or Firm* — Scheef & Stone, L.L.P.; Keith C. Rawlins, Esq.

(57) ABSTRACT

Clay-containing soils and shale are treated with a combination clay stabilizer having an alkali metal asphalt sulfonate in combination with a quaternary ammonium salt to reduce swelling of the clay component of the soil and shale.

18 Claims, 2 Drawing Sheets

COMBINATION CLAY STABILIZER HAVING AN ALKALI METAL ASPHALT SULFONATE AND QUATERNARY AMMONIUM SALT

FIELD OF THE DISCLOSURE

The present disclosure relates to reducing the swelling of clay-containing soils and subterranean formations when the soils and formations are contacted with water.

BACKGROUND

Clay stabilizers, also referred to as swelling inhibitors, may prevent the hydration and subsequent swelling of clay-containing materials, such as soils in the context of surface construction projects and shale formations in the context of wellbore drilling into a subterranean shale formation. Clay stabilizers can be added to clay-containing soils and shale formations to prevent the hydration of at least some clay particles in the soils and formations, which can reduce at least some swelling that would otherwise occur when the soils or formations are contacted with water.

There is ongoing need to minimize swelling of clay-containing soils and subterranean shale formations so as to preserve the integrity of a wellbore wall in the context of hydrocarbon wellbore drilling and to preserve foundation integrity for building construction.

SUMMARY

A combination clay stabilizer can include or consist of an alkali metal asphalt sulfonate and a quaternary ammonium salt.

A treated soil can include a clay and the combination clay stabilizer. The alkali metal asphalt sulfonate can be present in a range of from about 1 wt % to about 5 wt % based on a total weight of the treated soil, and the quaternary ammonium salt can be present in a range of from about 1 wt % to about 5 wt % based on a total weight of the treated soil.

A process can include adding the combination clay stabilizer to an untreated soil that contains clay to form a treated soil.

A wellbore fluid can include a carrier component and the combination clay stabilizer. The alkali metal asphalt sulfonate can be present in a range of from about 1 wt % to about 45 wt % based on a total weight of wellbore fluid, and the quaternary ammonium salt can be present in a range of from about 1 wt % to about 45 wt % based on a total weight of the wellbore fluid.

Another process can include contacting a wall of a wellbore with a wellbore fluid including a carrier component, an alkali metal asphalt sulfonate, and a quaternary ammonium salt, wherein the wall of the wellbore includes a clay-containing soil, a clay-containing shale, or both a clay-containing soil and a clay-containing shale.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
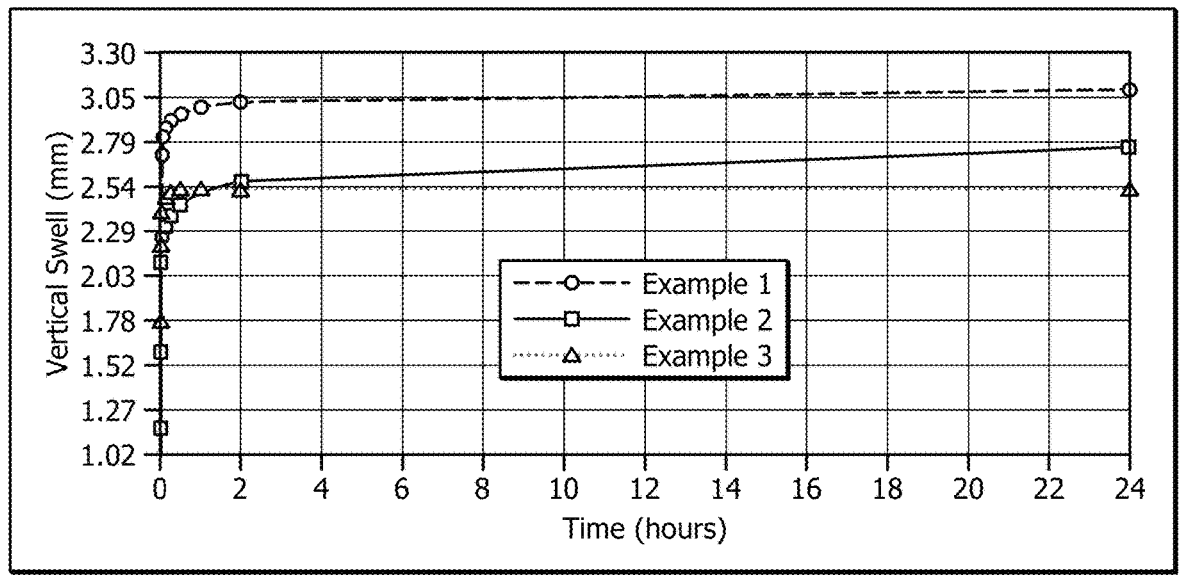
FIG. 1 illustrates a graph of vertical swell versus time for soil samples of Examples 1 to 3 subjected to a swelling experiments as described in the examples section.

"Soil" as used herein refers to the material on the Earth's upper layer above bedrock, which contains mineral particles and organic materials. The scope of "soil" as used herein includes clay-containing soils. "Clay-containing soil" and its variants as used herein refers to a soil that has clay particles as part of or all of the mineral particles that are found in the soil.

"Shale" as used herein refers to the commonly known sedimentary rock that contains clay. Shale can be found in subterranean formations that are drilled for purposes of hydrocarbon production.

"Clay" as used herein refers to the mineral particles in soil and shale that are swellable forms of clay particles, such as smectite, that swell due to hydration upon contact with water molecules.

"Wellbore fluid" as used herein includes drilling fluids used during operations in which a wellbore is drilled into a subterranean formation, and also treatment fluids for treating a wellbore at a time when drilling is not occurring, such as after drilling operation or after fracturing operations.

A combination clay stabilizer is disclosed herein, utilized in the disclosed treated soils, wellbore fluids, and processes, where the combination clay stabilizer has an alkali metal asphalt sulfonate in combination with a quaternary ammonium salt for clay stabilization and swelling inhibition. The presence of the alkali metal asphalt sulfonate in combination with a quaternary ammonium salt unexpectedly reduces swelling in a clay-containing soil and clay-containing shale more than either component alone. The alkali metal asphalt sulfonate and quaternary ammonium salt can have chemical, physical, or both chemical and physical interaction with the clay, such as to cover, bond to, seal, or otherwise attach to the clay particles in soil and shale—inhibiting the hydration of the clay particles in the soil and shale—and thus inhibiting the swelling that is associated with hydration of clays in soil and subterranean formation. The degree of reduction in swelling when utilizing the combination clay stabilizer disclosed herein is unexpected and can lead to improved soil stability in surface construction and wellbore stability in wellbore drilling operations.

Combination Clay Stabilizer

The combination clay stabilizer includes an alkali metal asphalt sulfonate and a quaternary ammonium salt. In some aspects, the clay stabilizer consists of the alkali metal asphalt sulfonate and the quaternary ammonium salt.

In aspects, the alkali metal asphalt sulfonate comprises a sodium asphalt sulfonate, a potassium asphalt sulfonate, or both a sodium asphalt sulfonate and a potassium asphalt sulfonate. Sodium asphalt sulfonate is commercially available as SOLTEX® E from Chevron Phillips Chemical Company. Potassium asphalt sulfonate is commercially available SOLTEX® Potassium from Chevron Phillips Chemical Company—the availability at a given time being subject to market conditions.

In aspects, the quaternary ammonium salt is any compound having a cation of the formula $[NR^1R^2R^3R^4]^+$ and an anion of the formula $X^-$, where: $R^1$ is a hydroxyalkyl group having from 1 to 18 carbon atoms; $R^2$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^3$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^4$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; and X is B, Br, Cl, F, N, O, P, S, or has the formula $R^5COO^-$ where $R^5$ is a hetero atom analog comprising i) a hetero atom and ii) an alkyl group, an alkenyl group, an alkynyl group, an aryl group, an alkylaryl group, an arylalkyl group, alkenylaryl group, arylalkenyl group, alkynylaryl group, or an arylalkynyl group, wherein the hetero atom is selected from B, Br, Cl, F, N, O, P, S, or combinations thereof.

In aspects, the hydroxyl moiety of the $R^1$ group is in the terminal position of the alkyl chain of the $R^1$ group, where the alkyl chain is linear.

Examples of quaternary ammonium salts include a alkylamine benzyl quaternary ammonium salt, a benzyl triethanolamine quaternary ammonium salt, a benzyl dimethylaminoethanolamine quaternary ammonium salt, a choline salt, or combinations thereof.

In aspects, the choline salt can be choline boride, choline bromide, choline chloride, choline fluoride, choline nitride, choline oxide, choline phosphide, choline sulfide, or combinations thereof. A specific example of a choline salt has the formula $[(CH_3)_3NCH_2CH_2OH]^+Cl^-$, which is known as choline chloride or (2-hydroxyethyl) trimethyl ammonium chloride.

In aspects, a weight ratio of the alkali metal asphalt sulfonate to the quaternary ammonium salt in the clay stabilizer is in a range of 0.1:1 to 10:1; alternatively, from 0.5:1 to 5:1; alternatively, from 0.5:1 to 4:1; alternatively, from 0.5:1 to 3:1; alternatively, from 0.5:1 to 2:1; alternatively, about 1:1; alternatively, 1:1.

Treated Soil

The treated soil disclosed herein comprises clay and the combination clay stabilizer comprising the alkali metal asphalt sulfonate and the quaternary ammonium salt disclosed herein. In aspects, the clay stabilizer in the treated soil consists of the alkali metal asphalt sulfonate and the quaternary ammonium salt.

In aspects, the alkali metal asphalt sulfonate is present in a range of from about 1 wt % to about 10 wt %, alternatively, from 1 wt % to 9 wt %; alternatively, from 1 wt % to 8 wt %; alternatively, from 1 wt % to 7 wt %; alternatively, from 1 wt % to 6 wt %; alternatively, from 1 wt % to 5 wt % based on a total weight of the treated soil.

In aspects, the quaternary ammonium salt is present in a range of from about 1 wt % to about 10 wt %, alternatively, from 1 wt % to 9 wt %; alternatively, from 1 wt % to 8 wt %; alternatively, from 1 wt % to 7 wt %; alternatively, from 1 wt % to 6 wt %; alternatively, from 1 wt % to 5 wt % based on a total weight of the treated soil.

In aspects, a weight ratio of the alkali metal asphalt sulfonate to the quaternary ammonium salt in a treated soil is in a range of 0.1:1 to 10:1; alternatively, from 0.5:1 to 5:1; alternatively, from 0.5:1 to 4:1; alternatively, from 0.5:1 to 3:1; alternatively, from 0.5:1 to 2:1; alternatively, about 1:1; alternatively, 1:1.

Wellbore Fluid

The wellbore fluid disclosed herein comprises a carrier component and the combination clay stabilizer disclosed herein. In aspects, the carrier component can be an aqueous component, a hydrocarbon component, or a mixture thereof (e.g., an oil-in-water emulsion or a water-in-oil emulsion). In aspects, the clay stabilizer in the wellbore fluid consists of the alkali metal asphalt sulfonate and the quaternary ammonium salt.

The aqueous component can include a fluid or solution that includes water as the major constituent. In aspects, the aqueous component may include fresh water, salt water, brine, municipal water, formation water, produced water, well water, filtered water, distilled water, seawater, or combinations thereof. The brine may include at least one of natural and synthetic brine, such as saturated brine or formate brine.

The hydrocarbon component can include a fluid or solution that includes hydrocarbons as the major constituent. In aspects, the hydrocarbons can be selected from crude oil, mineral oil, diesel, kerosene, fuel oil, or a combination thereof.

In aspects, the combination clay stabilizer is present in a range of from 1 wt % to 90 wt %; alternatively, from 1 wt % to 80 wt %; alternatively, from 1 wt % to 70 wt %; alternatively, from 1 wt % to 60 wt %; alternatively, from 1 wt % to 50 wt %; alternatively, from 1 wt % to 40 wt %; alternatively, from 1 wt % to 30 wt %; alternatively, from 1 wt % to 20 wt %; alternatively, from 1 wt % to 10 wt %; alternatively, from 1 wt % to 5 wt % based on a total weight of the wellbore fluid.

In aspects, the alkali metal asphalt sulfonate is present in a range of from 1 wt % to 45 wt %; 1 wt % to 40 wt %; 1 wt % to 35 wt %; alternatively, from 1 wt % to 30 wt %; alternatively, from 1 wt % to 25 wt %; alternatively, from 1 wt % to 20 wt %; alternatively, from 1 wt % to 15 wt %; alternatively, from 1 wt % to 10 wt %; alternatively, from 1 wt % to 5 wt % based on a total weight of the wellbore fluid.

In aspects, the quaternary ammonium salt is present in a range of from 1 wt % to 45 wt %; 1 wt % to 40 wt %; 1 wt % to 35 wt %; alternatively, from 1 wt % to 30 wt %; alternatively, from 1 wt % to 25 wt %; alternatively, from 1 wt % to 20 wt %; alternatively, from 1 wt % to 15 wt %; alternatively, from 1 wt % to 10 wt %; alternatively, from 1 wt % to 5 wt % based on a total weight of the wellbore fluid.

In aspects, a weight ratio of the alkali metal asphalt sulfonate to the quaternary ammonium salt in a wellbore fluid is in a range of 0.1:1 to 10:1; alternatively, from 0.5:1 to 5:1; alternatively, from 0.5:1 to 4:1; alternatively, from 0.5:1 to 3:1; alternatively, from 0.5:1 to 2:1; alternatively, about 1:1; alternatively, 1:1.

In aspects, additional components may be present in the wellbore fluid, such as a viscosifier, an alkalinity adjuster, a weighting agent, or a combination thereof.

In aspects where the wellbore fluid includes a viscosifier, the viscosifier may include polysaccharides, bentonite, polyacrylamides, polyanionic cellulose, or combinations thereof. For example, the viscosifier may include xanthan gum.

In aspects where the wellbore fluid includes an alkalinity adjuster, the alkalinity adjuster may include lime (e.g., calcium hydroxide, calcium oxide, or both), soda ash (e.g., sodium carbonate), sodium hydroxide, potassium hydroxide, or a combination thereof. The purpose of the alkalinity adjuster is to create a desired pH of the wellbore fluid.

In aspects where the wellbore fluid includes a weight agent, the weight agent can include barite, hematite, calcium carbonate, siderite, ilmenite, or combinations thereof.

In aspects, the wellbore fluid has a liquid phase with the combination clay stabilizer at least partially dissolved in the liquid phase.

The additional components can collectively be present in the wellbore fluid in an amount of from 0.1 wt % to 40 wt %, from 0.1 wt % to 35 wt %, from 0.1 wt % to 30 wt % from 0.1 wt % to 25 wt %, from 0.1 wt % to 20 wt %, from 0.1 wt % to 15 wt %, or from 0.1 wt % to 10 wt % based on total weight of the wellbore fluid.

Processes

A process disclosed herein includes adding the combination clay stabilizer to an untreated soil comprising a clay to form a treated soil. The combination clay stabilizer can have any composition and concentration of components in the treated soil disclosed herein. Adding can include introducing, contacting, mixing, or combinations thereof, either or both components of the combination clay stabilizer to the untreated soil, together or in any order. In aspects, the alkali metal asphalt sulfonate and the quaternary ammonium salt can be mixed to form the combination clay stabilizer, and then the mixed combination clay stabilizer can be added to untreated soil to form the treated soil. Alternatively, the alkali metal asphalt sulfonate can be added to the untreated soil to form an intermediate soil, and then the quaternary ammonium salt can be added to the intermediate soil to form the treated soil. Alternatively, the quaternary ammonium salt can be added to the untreated soil to form an intermediate soil, and then the alkali metal asphalt sulfonate can be added to the intermediate soil to form the treated soil. In aspects of the process that forms an intermediate soil, the intermediate soil can be agitated (stirred, bulldozed, shaken in a container, mixed in a container) to mix the untreated soil with the first component of the combination clay stabilizer (e.g., the alkali metal asphalt sulfonate or the quaternary ammonium salt), prior to adding the second component of the combination clay stabilizer (the alkali metal asphalt sulfonate or the quaternary ammonium salt) to the intermediate soil to form the treated soil.

In aspects, the untreated soil is the surface soil at a construction site, and the combination clay stabilizer is added to the untreated soil at the construction site and mixed into the untreated soil to form the treated soil. In other aspects, the untreated soil and the combination clay stabilizer can be mixed at a treated soil manufacturing facility to form the treated soil, and the treated soil is transported to a construction site.

Another process disclosed herein includes contacting a wall of a wellbore with a wellbore fluid comprising a carrier component, an alkali metal asphalt sulfonate, and a quaternary ammonium salt, wherein the wall of the wellbore comprises a clay-containing soil, a clay-containing shale, or both a clay-containing soil and a clay-containing shale. The combination clay stabilizer can have any composition and concentration of components in the wellbore fluid disclosed herein. This process can include introducing the wellbore fluid into the wellbore according to any technique known in the art with the aid of this disclosure, such as by pumping the wellbore fluid into the wellbore.

In the process, the wall of the wellbore can be contacted with the combination clay stabilizer contained in the wellbore fluid while drilling the wellbore. For example, when starting drilling operations at the surface of the Earth at a well-site, the wellbore fluid can be used as a drilling fluid and circulated continuously into and out of the zone of the drilling equipment in the forming wellbore. The combination clay stabilizer can reduce swelling of both clay-containing soil and shale as the wellbore is drilled into the surface of the Earth and through the shale-containing subterranean formation.

To the extent that clay-containing soil exists as the upper layer of Earth at the wellsite, the combination clay stabilizer in the wellbore fluid can contact the soil that forms the wall of the wellbore, covering, bonding to, sealing, or otherwise attaching to at least some of the clay particles in the clay-containing soil—inhibiting the hydration of the soil—and thus inhibiting the swelling that is associated with hydration of clays in soil. To the extent that the wellbore is drilling to a shale formation, the combination clay stabilizer in the wellbore fluid can contact the shale and any non-shale clay particles contained among layers of shale that forms the wall of the wellbore, covering, bonding to, sealing, or otherwise attaching to at least some of the clay particles in the shale and non-shale clay particles—inhibiting the hydration of the shale and clay particles—and thus inhibiting the swelling that is associated with hydration of clays in subterranean formations.

Prior to contacting, the wellbore fluid can be formed by adding the combination clay stabilizer to the carrier component to form the wellbore fluid. Adding can include introducing, contacting, mixing, or combinations thereof, either or both components of the combination clay stabilizer to the carrier component, together or in any order. In aspects, the alkali metal asphalt sulfonate and the quaternary ammonium salt can be mixed to form the combination clay stabilizer, and then the mixed combination clay stabilizer can be added to the carrier component to form the wellbore fluid. Alternatively, the alkali metal asphalt sulfonate can be added to the carrier component to form an intermediate fluid, and then the quaternary ammonium salt can be added to the intermediate fluid to form the wellbore fluid. Alternatively, the quaternary ammonium salt can be added to the carrier component to form an intermediate fluid, and then the alkali metal asphalt sulfonate can be added to the intermediate fluid to form the wellbore fluid. In aspects of the process that forms an intermediate fluid, the intermediate fluid can be agitated (stirred, shaken, mixed) to mix the carrier component with the first component of the combination clay stabilizer (e.g., the alkali metal asphalt sulfonate or the quaternary ammonium salt), prior to adding the second component of the combination clay stabilizer (the alkali metal asphalt sulfonate or the quaternary ammonium salt) to the intermediate fluid to form the wellbore fluid.

EXAMPLES

Soil swelling experiments were conducted using a swell consolidometer. Each experiment utilized a sample of untreated soil that contained clay.

Each untreated soil sample was prepared by using some of the untreated soil without adding any composition to the soil. For example, no alkali metal asphalt sulfonate and no quaternary ammonium salt were added to the untreated soil sample.

Each treated soil sample was prepared by mixing an untreated soil sample with a treatment composition described in the respective examples below to form treated soil, saturating the treated soil with deionized water, and drying the treated soil in an oven to form the treated soil sample.

To test the samples in each example, a filter disk and filter paper were placed in a sample ring of the consolidometer.

Each soil sample in the examples below was poured onto the filter disk in the sample rig of the consolidometer, the soil sample was lightly compacted so the soil sample in the sample ring had an even surface, and another filter disk and filter paper were placed on top of the soil sample in the sample ring. A weighted cylinder was placed on top of the assembled sample, and a gauge was set just above the cylinder to measure vertical expansion of the soil sample. The consolidometer tank was then filled with deionized water, and a timer was started. Gauge readings were recorded over time to measure the change in vertical height as the soil sample expanded.

The same untreated soil was used for each example, either as untreated soil tested or untreated soil that was used to prepare the treated soil sample.

Examples 1 to 3

Examples 1 to 3 demonstrate that using an alkali metal asphalt sulfonate or a quaternary ammonium salt alone can reduce swelling of soil compared to untreated soil. The alkali metal asphalt sulfonate used in Examples 1 to 3 was potassium asphalt sulfonate, and the quaternary ammonium salt was choline chloride.

Example 1 tested an untreated soil sample containing 100 wt % of untreated soil. As can be seen in FIG. 1, swelling occurred quickly over about 2 hours, and the untreated soil sample swelled or expanded vertically about 3 mm. After 24 hours, the swelling was slightly over 3.05 mm.

Example 2 tested a treated soil sample. The composition for treatment was potassium asphalt sulfonate (KAS). The overall composition of the treated soil sample was 95 wt % untreated soil and 5 wt % KAS based on total weight of the treated soil sample. As can be seen in FIG. 1, swelling occurred quickly over about 2 hours, and the treated soil sample swelled or expanded vertically about 2.54 mm. After 24 hours, the swelling was about 2.79 mm.

Noticeable reduction in swelling can be seen in Example 2 (treated soil) compared to Example 1 (untreated soil), with presence of 5 wt % KAS reducing the swelling from over 3.05 mm to about 2.79 mm, about 8.5% decrease in swelling after 24 hours.

Example 3 tested a treated soil sample. The composition for treatment was choline chloride (CC). The overall composition of the treated soil sample was 95 wt % untreated soil and 5 wt % CC based on a total weight of the treated soil sample. As can be seen in FIG. 1, swelling occurred quickly in less than an hour, and the treated soil sample swelled or expanded vertically to about 2.54 mm. After 24 hours, the swelling remained almost with no change, about 2.54 mm. Noticeable reduction in swelling can be seen in Example 3 (treated soil) compared to Example 1 (untreated soil), with presence of 5 wt % CC reducing the swelling from over 3.05 mm to about 2.54 mm, about 16.7% decrease in swelling after 24 hours.

Examples 4 to 6

Examples 4 to 6 demonstrate that using an alkali metal asphalt sulfonate in combination with quaternary ammonium salt provides a greater reduction in swelling than either component alone. The alkali metal asphalt sulfonate used in Examples 4 to 6 was potassium asphalt sulfonate, and the quaternary ammonium salt was choline chloride.

Figure 2:
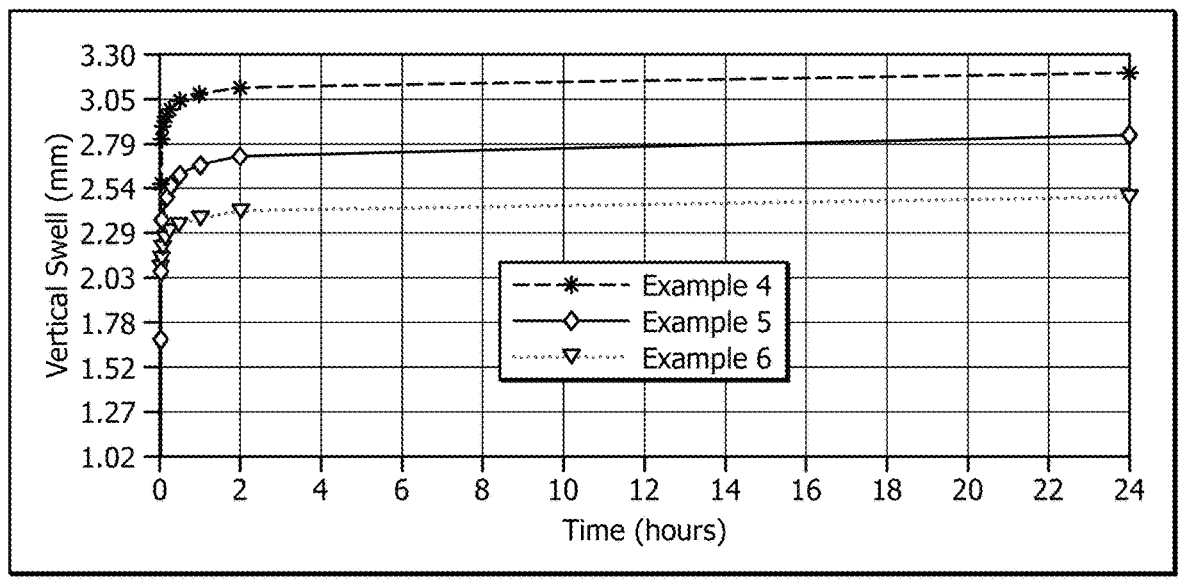
FIG. 2 illustrates a graph of vertical swell versus time for soil samples of Examples 4 to 6 subjected to a swelling experiments as described in the examples section.

Example 4 tested an untreated soil sample containing 100 wt % of untreated soil. As can be seen in FIG. 2, swelling occurred quickly over about 2 hours, and the untreated soil sample swelled or expanded vertically to above 3.05 mm. After 24 hours, the swelling was closer to 3.20 mm.

Example 5 tested a treated soil sample. The composition for treatment was potassium asphalt sulfonate (KAS). The overall composition of the treated soil sample was 98 wt % untreated soil and 2 wt % KAS based on total weight of the treated soil sample. As can be seen in FIG. 2, swelling occurred quickly over about 2 hours, and the treated soil sample swelled or expanded vertically about 2.75 mm. After 24 hours, the swelling was about 2.80 mm.

Noticeable reduction in swelling can be seen in Example 5 (KAS treated soil) compared to Example 4 (untreated soil), with presence of 2 wt % KAS reducing the swelling from over 3.20 mm to about 2.80 mm, about 12.5% decrease in swelling after 24 hours.

Example 6 tested a treated soil sample. The composition for treatment was KAS and choline chloride (CC). The overall composition of the treated soil sample was 98 wt % untreated soil, 1 wt % KAS, and 1 wt % CC based on a total weight of the treated soil sample. As can be seen in FIG. 2, swelling occurred quickly over about 2 hours, and the treated soil sample swelled or expanded vertically to about 2.4 mm. After 24 hours, the swelling increased to about 2.53 mm.

Noticeable reduction in swelling can be seen in Example 6 (KAS+CC treated soil) compared to Example 4 (untreated soil), with presence of 1 wt % KAS and 1 wt % CC reducing the swelling from over 3.20 mm to about 2.53 mm, about 20.9% decrease in swelling after 24 hours.

Noticeable reduction in swelling can be seen in Example 6 (KAS+CC treated soil) compared to Example 5 (KAS treated soil), with presence of 1 wt % KAS and 1 wt % CC reducing the swelling compared to the untreated soil by about 20.9% after 24 hours while the presence of 2 wt % KAS reduced the swelling compared to untreated soil by about 12.5% after 24 hours. It was unexpected that the combination of alkali metal asphalt sulfonate with a quaternary ammonium salt would provide greater reduction in swelling than either component alone.

Examples 7 and 8

Examples 7 and 8 demonstrate that an alkali metal asphalt sulfonate in combination with choline chloride provides a significant reduction in swelling compared to untreated soil.

Figure 3:
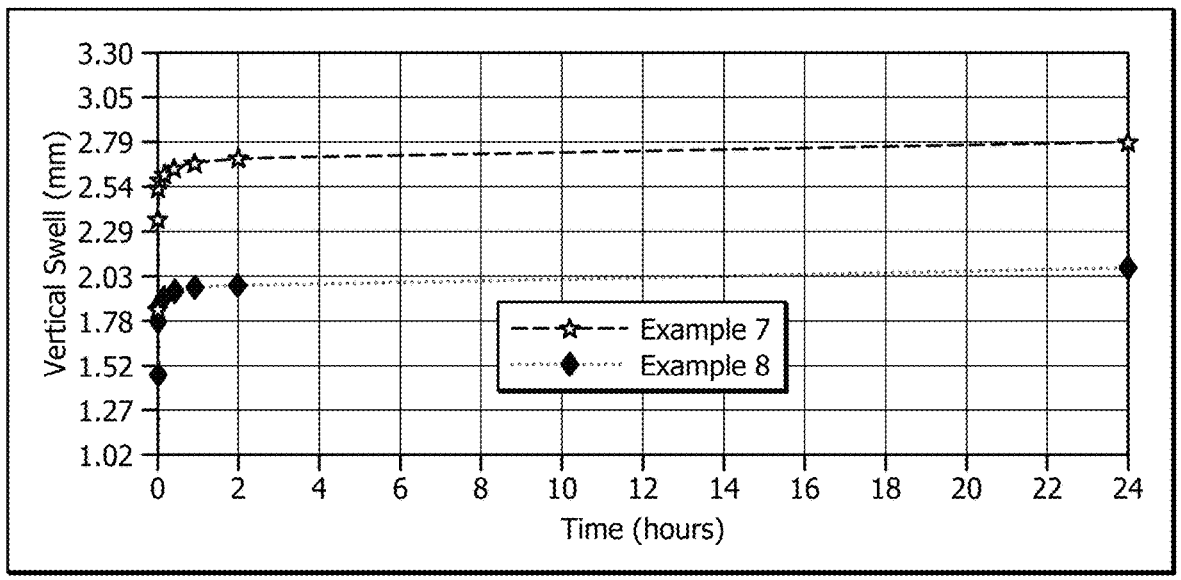
FIG. 3 illustrates a graph of vertical swell versus time for soil samples of Examples 7 to 8 subjected to a swelling experiments as described in the examples section.

Example 7 tested an untreated soil sample containing 100 wt % of untreated soil. As can be seen in FIG. 3, swelling occurred quickly over about 2 hours, and the untreated soil sample swelled or expanded vertically to about 2.75 mm. After 24 hours, the swelling was closer to 2.79 mm.

Example 8 tested a treated soil sample. The composition for treatment was KAS and CC. The overall composition of the treated soil sample was 95 wt % untreated soil, 2.5 wt % KAS, and 2.5 wt % CC based on a total weight of the treated soil sample. As can be seen in FIG. 3, swelling occurred quickly over about 2 hours, and the treated soil sample swelled or expanded vertically to about 2.0 mm. After 24 hours, the swelling increased to about 2.04 mm.

Noticeable reduction in swelling can be seen in Example 8 (KAS+CC treated soil) compared to Example 7 (untreated soil), with presence of 2.5 wt % KAS and 2.5 wt % CC reducing the swelling from about 2.79 mm to about 2.04 mm, about 26.9% decrease in swelling after 24 hours. Example 8 compared to Example 6 also suggests that increasing the concentration of each of the combination of alkali metal asphalt sulfonate and quaternary ammonium salt can further reduce swelling of soil.

Examples 9 and 10

Examples 9 and 10 demonstrate that an alkali metal asphalt sulfonate in combination with choline chloride provides a significant reduction in swelling compared to untreated soil.

Figure 4:
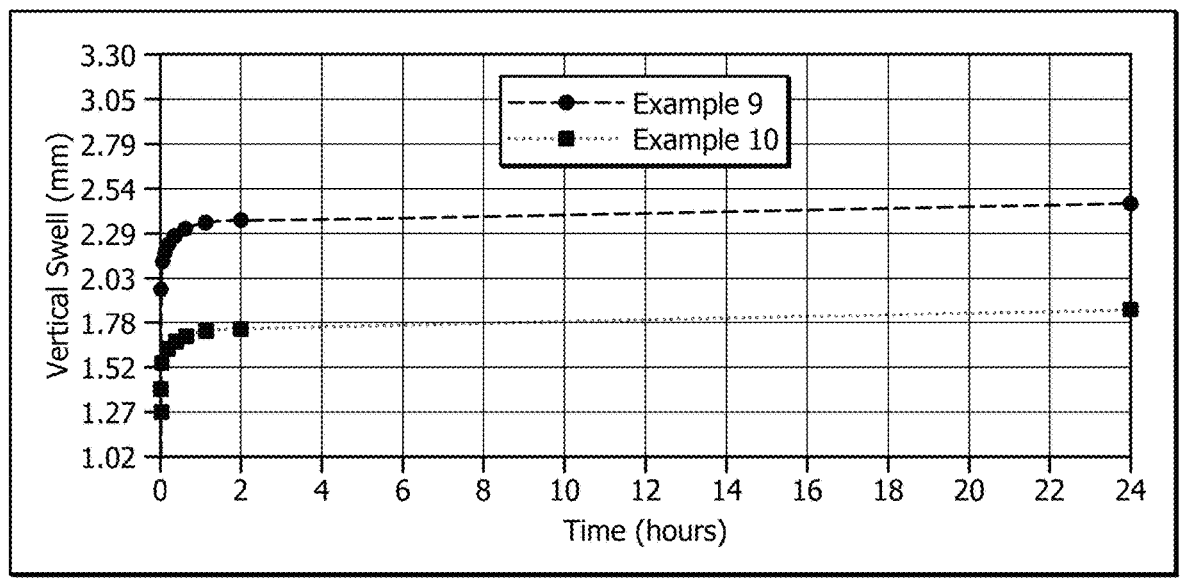
FIG. 4 illustrates a graph of vertical swell versus time for soil samples of Examples 9 to 10 subjected to a swelling experiments as described in the examples section.

Example 9 tested an untreated soil sample containing 100 wt % of untreated soil. As can be seen in FIG. 4, swelling occurred quickly over about 2 hours, and the untreated soil sample swelled or expanded vertically to about 2.35 mm. After 24 hours, the swelling was closer to 2.50 mm.

Example 10 tested a treated soil sample. The composition for treatment was KAS and CC. The overall composition of the treated soil sample was 94 wt % untreated soil, 3 wt % KAS, and 3 wt % CC based on a total weight of the treated soil sample. As can be seen in FIG. 4, swelling occurred quickly over about 2 hours, and the treated soil sample swelled or expanded vertically to about 1.78 mm. After 24 hours, the swelling increased to about 1.80 mm.

Noticeable reduction in swelling can be seen in Example 10 (KAS+CC treated soil) compared to Example 9 (untreated soil), with presence of 3 wt % KAS and 3 wt % CC reducing the swelling from about 2.50 mm to about 1.80 mm, about 28.0% decrease in swelling after 24 hours.

Example 10 compared to Examples 6 and 8 also suggests that increasing the concentration of each of the combination of alkali metal asphalt sulfonate and quaternary ammonium salt beyond 2.5 wt % may provide some additional reduction in swelling, but that the primary reduction in swelling is seen at concentrations up to 2.5 wt % to 3 wt % for each of the alkali metal asphalt sulfonate and the quaternary ammonium salt.

ADDITIONAL DESCRIPTION

Aspect 1. A process comprising: adding a combination clay stabilizer to an untreated soil comprising a clay to form a treated soil, wherein the combination clay stabilizer comprises an alkali metal asphalt sulfonate and a quaternary ammonium salt.

Aspect 2. The process of Aspect 1, wherein the alkali metal asphalt sulfonate comprises sodium asphalt sulfonate, potassium asphalt sulfonate, or a combination thereof.

Aspect 3. The process of Aspect 1 or claim 2, wherein the quaternary ammonium salt has a cation of the formula $[NR^1R^2R^3R^4]^+$ and an anion of the formula $X^-$, where: $R^1$ is a hydroxyalkyl group having from 1 to 18 carbon atoms; $R^2$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^3$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^4$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; and X is B, Br, Cl, F, N, O, P, S, or has the formula $R^5COO^-$ wherein $R^5$ is a hetero atom analog comprising i) a hetero atom and ii) an alkyl group, an alkenyl group, an alkynyl group, an aryl group, an alkylaryl group, an arylalkyl group, alkenylaryl group, arylalkenyl group, alkynylaryl group, or an arylalkynyl group, wherein the hetero atom is selected from B, Br, Cl, F, N, O, P, S, or combinations thereof.

Aspect 4. The process of any one of Aspects 1 to 3, wherein a weight ratio of the alkali metal asphalt sulfonate to the quaternary ammonium salt in the clay stabilizer is in a range of 0.1:1 to 10:1.

Aspect 5. The process of any one of Aspects 1 to 4, wherein the alkali metal asphalt sulfonate is present in a range of from about 1 wt % to about 5 wt % based on a total weight of the treated soil.

Aspect 6. The process of any one of Aspects 1 to 5, wherein the quaternary ammonium salt is present in a range of from about 1 wt % to about 5 wt % based on a total weight of the treated soil.

Aspect 7. The process of any one of Aspects 1 to 6, wherein the clay is present in the soil in an amount of from X wt % to 100 wt % based on a total weight of the untreated soil.

Aspect 8. The process of any one of Aspects 1 to 7, wherein the clay comprises smectite.

Aspect 9. A process comprising: contacting a wall of a wellbore with a fluid comprising a carrier component, an alkali metal asphalt sulfonate, and a quaternary ammonium salt, wherein the wall of the wellbore comprises a clay-containing soil, a clay-containing shale, or both a clay-containing soil and a clay-containing shale.

Aspect 10. The process of Aspect 9, wherein the alkali metal asphalt sulfonate comprises sodium asphalt sulfonate, potassium asphalt sulfonate, or a combination thereof.

Aspect 11. The process of Aspect 9 or claim 10, wherein the quaternary ammonium salt has a cation of the formula $[NR^1R^2R^3R^4]^+$ and an anion of the formula $X^-$, where: $R^1$ is a hydroxyalkyl group having from 1 to 18 carbon atoms; $R^2$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^3$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^4$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; and X is B, Br, Cl, F, N, O, P, S, or has the formula $R^5COO^-$ wherein $R^5$ is a hetero atom analog comprising i) a hetero atom and ii) an alkyl group, an alkenyl group, an alkynyl group, an aryl group, an alkylaryl group, an arylalkyl group, alkenylaryl group, arylalkenyl group, alkynylaryl group, or an arylalkynyl group, wherein the hetero atom is selected from B, Br, Cl, F, N, O, P, S, or combinations thereof.

Aspect 12. The process of any one of Aspects 9 to 11, wherein a weight ratio of the alkali metal asphalt sulfonate to the quaternary ammonium salt in the fluid is in a range of 0.1:1 to 10:1.

Aspect 13. The process of any one of Aspects 9 to 12, wherein the alkali metal asphalt sulfonate is present in the fluid in a range of from about 1 wt % to about 5 wt % based on a total weight of the fluid.

Aspect 14. The process of any one of Aspects 9 to 13, wherein the quaternary ammonium salt is present in the fluid in a range of from about 1 wt % to about 5 wt % based on a total weight of the fluid.

Aspect 15. The process of any one of Aspects 9 to 14, wherein the clay-containing soil comprises smectite and wherein the clay-containing shale comprises smectite.

Aspect 16. A combination clay stabilizer comprising: an alkali metal asphalt sulfonate; and a quaternary ammonium salt.

Aspect 17. The clay stabilizer of Aspect 16, wherein the alkali metal asphalt sulfonate comprises sodium asphalt sulfonate, potassium asphalt sulfonate, or a combination thereof.

Aspect 18. The clay stabilizer of Aspect 16 or claim 17, wherein the quaternary ammonium salt has a cation of the formula $[NR^1R^2R^3R^4]^+$ and an anion of the formula $X^-$, where: $R^1$ is a hydroxyalkyl group having from 1 to 18 carbon atoms; $R^2$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^3$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; $R^4$ is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; and X is B, Br, Cl, F, N, O, P, S, or has the formula $R^5COO^-$ wherein $R^5$ is a hetero atom analog comprising i) a hetero atom and ii) an alkyl group, an alkenyl group, an alkynyl group, an aryl group, an alkylaryl group, an arylalkyl group, alkenylaryl group, arylalkenyl group, alkynylaryl group, or an arylalkynyl group, wherein the hetero atom is selected from B, Br, Cl, F, N, O, P, S, or combinations thereof.

Aspect 19. The clay stabilizer of any one of Aspects 16 to 18, wherein a weight ratio of the alkali metal asphalt sulfonate to the quaternary ammonium salt in the clay stabilizer is 1:1.

Aspect 20. A treated soil comprising: clay; and a combination clay stabilizer comprising an alkali metal asphalt sulfonate and a quaternary ammonium salt, wherein the alkali metal asphalt sulfonate is present in a range of from about 1 wt % to about 5 wt % based on a total weight of the treated soil, and wherein the quaternary ammonium salt is present in a range of from about 1 wt % to about 5 wt % based on a total weight of the treated soil.

Aspect 21. A wellbore fluid comprising: a carrier component; and a combination clay stabilizer comprising an alkali metal asphalt sulfonate and a quaternary ammonium salt, wherein the alkali metal asphalt sulfonate is present in a range of from about 1 wt % to about 45 wt % based on a total weight of wellbore fluid, and wherein the quaternary ammonium salt is present in a range of from about 1 wt % to about 45 wt % based on a total weight of the wellbore fluid.

Aspect 22. A combination clay stabilizer comprising an alkali metal asphalt sulfonate and a quaternary ammonium salt.

Aspect 23. The combination clay stabilizer of Aspect 22, wherein the alkali metal asphalt sulfonate comprises sodium asphalt sulfonate, potassium asphalt sulfonate, or a combination thereof.

Aspect 24. The combination clay stabilizer of Aspect 22 or 23, wherein the quaternary ammonium salt has a cation of a formula $[NR1R^2R3R4]+$ and an anion of a formula X—, where: R1 is a hydroxyalkyl group having from 1 to 18 carbon atoms; R2 is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; R3 is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; R4 is an alkyl group, an alkenyl group, an alkynyl group, an aryl group, an alkylaryl group, an arylalkyl group, alkenylaryl group, arylalkenyl group, alkynylaryl group, or an arylalkynyl group having from 1 to 18 carbon atoms; and X is B, Br, Cl, F, N, O, P, S, or has the formula R5COO— wherein R5 is a hetero atom analog comprising i) a hetero atom and ii) an alkyl group, an alkenyl group, an alkynyl group, an aryl group, an alkylaryl group, an arylalkyl group, alkenylaryl group, arylalkenyl group, alkynylaryl group, or an arylalkynyl group, wherein the hetero atom is selected from B, Br, Cl, F, N, O, P, S, or combinations thereof.

Aspect 25. The combination clay stabilizer of Aspect 24, wherein the quaternary ammonium salt is a choline salt.

Aspect 26. The combination clay stabilizer of Aspect 25, wherein the choline salt is choline boride, choline bromide, choline chloride, choline fluoride, choline nitride, choline oxide, choline phosphide, choline sulfide, or combinations thereof.

Aspect 27. The combination clay stabilizer of any one of Aspects 22 to 26, consisting of the alkali metal asphalt sulfonate and the quaternary ammonium salt.

Aspect 28. The combination clay stabilizer of any one of Aspects 22 to 27, wherein a weight ratio of the alkali metal asphalt sulfonate to the quaternary ammonium salt in the combination clay stabilizer is in a range of 0.1:1 to 10:1.

Aspect 29. The combination clay stabilizer of any one of Aspects 22 to 28, wherein a weight ratio of the alkali metal asphalt sulfonate to the quaternary ammonium salt in the combination clay stabilizer is 1:1.

Aspect 30. A wellbore fluid comprising: a carrier component; and the combination clay stabilizer of any one of Aspects 22 to 29, wherein the combination clay stabilizer is present in a range of from 1 wt % to 90 wt % based on a total weight of the wellbore fluid.

Aspect 31. The wellbore fluid of Aspect 30, wherein the alkali metal asphalt sulfonate is present in a range of from about 1 wt % to about 45 wt % based on a total weight of wellbore fluid, and wherein the quaternary ammonium salt is present in a range of from about 1 wt % to about 45 wt % based on a total weight of the wellbore fluid.

Aspect 32. The wellbore fluid of Aspect 30 or 31, wherein the carrier component comprises an aqueous component, a hydrocarbon component, or both an aqueous component and a hydrocarbon component.

Aspect 33. The wellbore fluid of Aspect 32, wherein the aqueous component comprises fresh water, salt water, brine, municipal water, formation water, produced water, well water, filtered water, distilled water, seawater, or combinations thereof.

Aspect 34. The wellbore fluid of Aspect 32 or 33, wherein the hydrocarbon component comprises a crude oil, a mineral oil, a diesel, a kerosene, a fuel oil, or a combination thereof.

Aspect 35. The wellbore fluid of any one of Aspects 30 to 34, further comprising a viscosifier, an alkalinity adjuster, a weighting agent, or a combination thereof.

Aspect 36. A process comprising: adding the combination clay stabilizer of any one of Aspects 22 to 29 to an untreated soil comprising a clay to form a treated soil.

Aspect 37. The process of Aspect 36, wherein the alkali metal asphalt sulfonate is present in a range of from about 1 wt % to about 5 wt % based on a total weight of the treated soil, wherein the quaternary ammonium salt is present in a range of from about 1 wt % to about 5 wt % based on a total weight of the treated soil.

Aspect 38. A process comprising: contacting a wall of a wellbore with a fluid comprising a carrier component and the combination clay stabilizer of any one of Aspects 22 to 29, wherein the wall of the wellbore comprises a clay-containing soil, a shale, or both a clay-containing soil and a shale.

Aspect 39. The process of Aspect 38, wherein the alkali metal asphalt sulfonate is present in the fluid in a range of from about 1 wt % to about 45 wt % based on a total weight of the fluid, wherein the quaternary ammonium salt is present in the fluid in a range of from about 1 wt % to about 45 wt % based on a total weight of the fluid.

Aspect 40. A treated soil comprising: clay; and the combination clay stabilizer of any one of Aspects 22 to 29, wherein the alkali metal asphalt sulfonate is present in a range of from about 1 wt % to about 5 wt % based on a total weight of the treated soil, and wherein the quaternary ammonium salt is present in a range of from about 1 wt % to about 5 wt % based on a total weight of the treated soil.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A combination clay stabilizer comprising:
   an alkali metal asphalt sulfonate; and
   a quaternary ammonium salt, wherein the quaternary ammonium salt is a choline salt.

2. The combination clay stabilizer of claim 1, wherein the alkali metal asphalt sulfonate comprises sodium asphalt sulfonate, potassium asphalt sulfonate, or a combination thereof.

3. The combination clay stabilizer of claim 1, wherein the choline salt is choline boride, choline bromide, choline chloride, choline fluoride, choline nitride, choline oxide, choline phosphide, choline sulfide, or combinations thereof.

4. The combination clay stabilizer of claim 1, consisting of the alkali metal asphalt sulfonate and the quaternary ammonium salt.

5. The combination clay stabilizer of claim 1, wherein a weight ratio of the alkali metal asphalt sulfonate to the quaternary ammonium salt in the combination clay stabilizer is in a range of 0.1:1 to 10:1.

6. The combination clay stabilizer of claim 1, wherein a weight ratio of the alkali metal asphalt sulfonate to the quaternary ammonium salt in the combination clay stabilizer is 1:1.

7. A treated soil comprising:
   clay; and
   the combination clay stabilizer of claim 1,
   wherein the alkali metal asphalt sulfonate is present in a range of from about 1 wt % to about 5 wt % based on a total weight of the treated soil, and
   wherein the quaternary ammonium salt is present in a range of from about 1 wt % to about 5 wt % based on a total weight of the treated soil.

8. A wellbore fluid comprising:
   a carrier component; and
   the combination clay stabilizer of claim 1,
   wherein the combination clay stabilizer is present in a range of from 1 wt % to 90 wt % based on a total weight of the wellbore fluid.

9. The wellbore fluid of claim 8, wherein the alkali metal asphalt sulfonate is present in a range of from about 1 wt % to about 45 wt % based on a total weight of the wellbore fluid, and wherein the quaternary ammonium salt is present in a range of from about 1 wt % to about 45 wt % based on a total weight of the wellbore fluid.

10. The wellbore fluid of claim 8, wherein the carrier component comprises an aqueous component, a hydrocarbon component, or both an aqueous component and a hydrocarbon component.

11. The wellbore fluid of claim 10, wherein the aqueous component comprises fresh water, salt water, brine, municipal water, formation water, produced water, well water, filtered water, distilled water, seawater, or combinations thereof.

12. The wellbore fluid of claim 10, wherein the hydrocarbon component comprises a crude oil, a mineral oil, a diesel, a kerosene, a fuel oil, or a combination thereof.

13. The wellbore fluid of claim 8, further comprising a viscosifier, an alkalinity adjuster, a weighting agent, or a combination thereof.

14. A process comprising:
   adding the combination clay stabilizer of claim 1 to an untreated soil comprising a clay to form a treated soil.

15. The process of claim 14, wherein the alkali metal asphalt sulfonate is present in a range of from about 1 wt % to about 5 wt % based on a total weight of the treated soil, wherein the quaternary ammonium salt is present in a range of from about 1 wt % to about 5 wt % based on a total weight of the treated soil.

16. A process comprising:
   contacting a wall of a wellbore with a fluid comprising a carrier component and the combination clay stabilizer of claim 1, wherein the wall of the wellbore comprises a clay-containing soil, a shale, or both a clay-containing soil and a shale.

17. The process of claim 16, wherein the alkali metal asphalt sulfonate is present in the fluid in a range of from about 1 wt % to about 45 wt % based on a total weight of the fluid, wherein the quaternary ammonium salt is present in the fluid in a range of from about 1 wt % to about 45 wt % based on a total weight of the fluid.

18. The process of claim 16, wherein the clay-containing soil comprises smectite.

* * * * *